United States Patent
Pambucol et al.

(10) Patent No.: US 9,846,056 B1
(45) Date of Patent: Dec. 19, 2017

(54) METHOD AND APPARATUS FOR METER ACTIONS BASED ON SOCKET IDENTIFICATION

(71) Applicant: Honeywell International Inc., Morris Plains, NJ (US)

(72) Inventors: Vlad Pambucol, Raleigh, NC (US); John Richard Holt, Wake Forest, NC (US); Konstantin Labastov, Raleigh, NC (US); David Cooper, Raleigh, NC (US); Scott Holdsclaw, Raleigh, NC (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/185,961

(22) Filed: Jun. 17, 2016

(51) Int. Cl.
*G01D 4/00* (2006.01)
*H04B 5/00* (2006.01)

(52) U.S. Cl.
CPC ........... *G01D 4/002* (2013.01); *H04B 5/0031* (2013.01)

(58) Field of Classification Search
CPC ............................. G01D 4/002; H04B 5/0031
See application file for complete search history.

(56) References Cited

U.S. PATENT DOCUMENTS

| 7,432,823 | B2 | 10/2008 | Soni |
| 9,047,712 | B2 | 6/2015 | King et al. |
| 2010/0306033 | A1* | 12/2010 | Oved ............... G06Q 10/06375 705/7.37 |

FOREIGN PATENT DOCUMENTS

| JP | 2009-134654 A | 6/2009 |
| JP | 2010-068601 A | 3/2010 |
| KR | 100759108 B1 | 9/2007 |

* cited by examiner

*Primary Examiner* — Leon Flores
(74) *Attorney, Agent, or Firm* — Baker & Hostetler LLP

(57) ABSTRACT

A metering system for metering consumption of a commodity. The metering system includes a meter socket, a meter, and a controller. The meter socket has a tag with identification information. The meter includes a sensor configured to read the identification information from the tag of the meter socket and provide a signal indicative of the identification information from the tag. The controller includes a memory and a processor and is configured to record energy consumption data from the meter. The processor is configured to receive the signal indicative of the identification information of the tag and associate the energy consumption data with the identification information of the tag. The processor is further configured to store the energy consumption data associated with the identification information of the tag in the memory.

17 Claims, 4 Drawing Sheets

METHOD AND APPARATUS FOR METER ACTIONS BASED ON SOCKET IDENTIFICATION

TECHNICAL FIELD

The present invention relates to a metering system and method, and more particularly, to systems, methods, and apparatus for metering device identification and actions based on this identification.

BACKGROUND

One way in which electric utility customers may attempt theft of electrical service is to switch electricity meters between consumers. If the consumption of electricity is known to be greater at a consumer's location than at a neighbor's location, the consumer could attempt to physically interchange the electricity meter at the consumer's location with the electricity meter at the neighbor's location to decrease the amount of electricity consumption reported by the electricity meter associated with the consumer. Because electricity meters are often read wirelessly from a head-end monitoring system that typically is not aware of the geographic location of each meter, the electricity consumption monitored by a particular electricity meter may not correspond with the actual electricity being consumed at the consumer's location.

One method used for detecting whether an electricity meter has been moved to another location is to have the meter equipped with a GPS module. After installation, the GPS coordinates of the meter location are stored within the meter. If the meter location is altered, the meter may send an alarm to the head-end system indicating the GPS coordinate change. However, this method is costly to implement, consumes a lot of power, may lack ability to acquire satellites and lacks precise location, especially in locations where multiple meters are installed in close proximity (such as apartment buildings).

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

An improved and/or simplified metering system for determining where an electricity meter is installed is desired to minimize theft of electricity, minimize costs to implement, increase precision, and/or increase the effectiveness of monitoring electricity consumption at a consumer location.

An aspect of the present disclosure provides a metering system comprising a meter socket, a meter, and a controller. The meter socket is installed at a utility customer location and includes an information storage device comprising identification information. The meter is configured to couple to (e.g., be installed in) the meter socket. The meter includes a sensor configured to obtain the identification information from the information storage device of the meter socket and to provide a signal indicative of the identification information. The controller comprises a memory and a processor and is configured to record energy consumption measured by the meter at a customer location. The processor is further configured to receive the signal indicative of the identification information and associate the energy consumption data with the identification information. The processor may be further configured to store the energy consumption data associated with the identification information in the memory.

Another aspect of the present disclosure provides a method for associating a meter with a meter socket. In one embodiment, the method comprises obtaining identification information from an information storage device coupled to the meter socket; recording energy consumption measured by the meter; associating the recorded energy consumption with the identification information obtained from the information storage device coupled to the meter socket; and storing the recorded energy consumption associated with the identification information in a memory of the meter.

Another aspect of the present disclosure provides a metering device configured to couple to a meter socket. The meter socket includes a information storage device comprising identification information. The metering device is configured to measure electricity consumption at a customer location and comprises a controller. The meter further comprises a sensor configured to obtain the identification information from the information storage device of the meter socket. The controller may include a processor and a memory and be configured to record energy consumption measured by the meter. The memory is configured to store data reflecting the measured energy consumption, and the processor is configured to associate the energy consumption data with the identification information obtained from the information storage device of the meter socket. The processor is further configured to store the energy consumption data associated with the identification information in the memory.

This summary is provided to introduce a selection of concepts in a simplified form that are further described below in the Description of the Invention section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein.

DESCRIPTION OF THE INVENTION

The disclosure relates generally to metering systems and methods for monitoring consumption of a commodity, such as electricity. Although the system and methods are described herein in the context of a system for metering electrical energy consumption, it is understood that the system and methods described herein may be implemented in systems that monitor consumption of other commodities, such as, for example, water or gas. In one embodiment, the metering system includes a meter and a meter socket located at a customer location. The meter socket includes a storage device that keeps identification unique to the meter socket. The meter includes a means of obtaining the information from the meter socket. This could be a physical connection such as a cable between the meter and device in the socket, a wireless RF connection, or other means. In this description, the meter includes a sensor, and the meter socket includes an information storage device comprising identification information. As used herein, the term "information storage device" will be understood to include a means to store identification information in the meter socket and a means to communicate that information to the meter as described in further detail below. When the meter is coupled to the meter socket, the sensor may obtain the identification information from the information storage device, and either identify or create a billing register associated with the information storage device. When a commodity is supplied to the customer location, the meter monitors the consumption of the commodity, associates the consumption with the information storage device information, and stores the information storage device information along with the associated consumption data in a memory.

Figure 1:
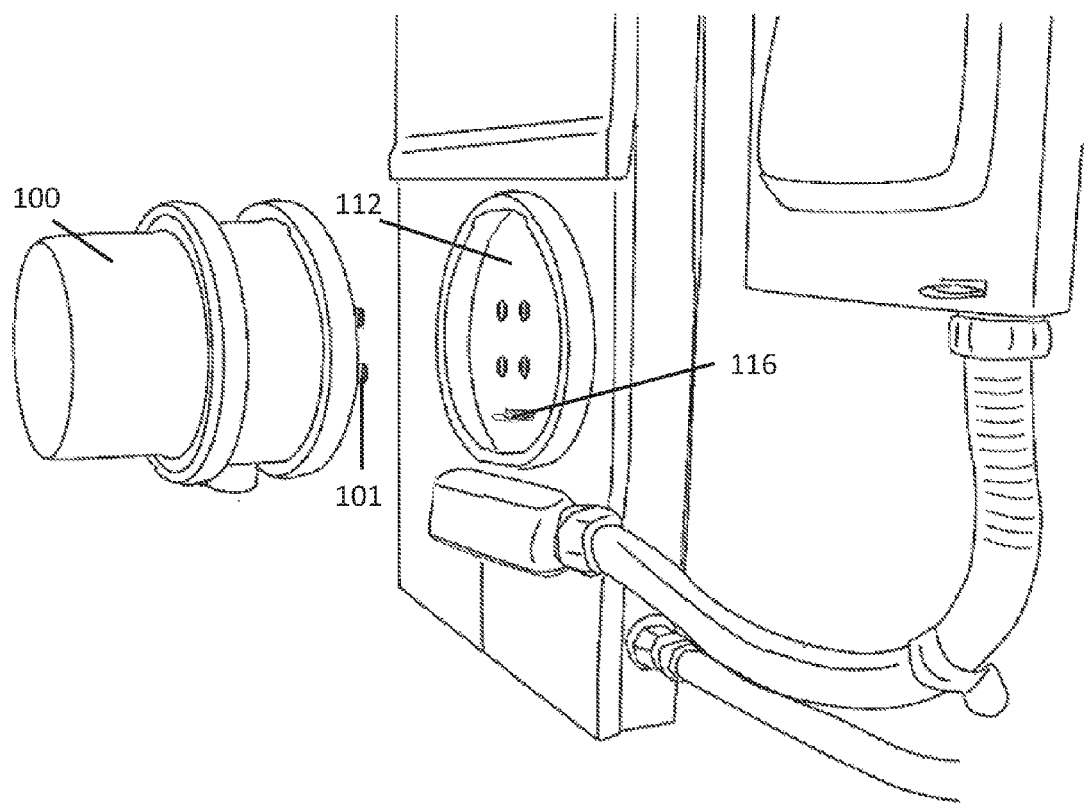
FIG. 1 illustrates a metering system in which the systems, methods, and apparatus disclosed herein may be embodied.

FIG. 1 provides a perspective view of a meter 100 and a meter socket 112 that may be installed at a utility customer location. The meter socket may, in turn, be connected to one or more electrical loads at the customer location. In one embodiment, the meter socket 112 is configured to receive and electrically connect with blades 101 of the meter 100. Meter 100 may be any type of meter configured to measure and indicate the amount of energy consumption at a customer location, such as a residence, industry or business.

Meter 100 may be part of a metering network in which the methods, systems, and apparatus disclosed herein may be employed. The metering network may comprise a plurality of meters 100, which are operable to sense and record consumption or usage of a service or commodity. Meters 100 may be located at customer premises, such as a home or place of business. Meters 100 comprise circuitry for measuring the consumption of the service or commodity being consumed at their respective locations and for generating data reflecting the consumption, as well as other data related thereto. Meters 100 may also comprise circuitry for wirelessly transmitting data generated by the meter to a remote location. Meters 100 may further comprise circuitry for receiving data, commands or instructions wirelessly as well. Meters that are operable to both receive and transmit data may be referred to as "bi-directional" or "two-way" meters, while meters that are only capable of transmitting data may be referred to as "transmit-only" or "one-way" meters. In bi-directional meters, the circuitry for transmitting and receiving may comprise a transceiver.

The meter socket 112 may further comprise an information storage device 116. As illustrated, the information storage device 116 is represented as a tag; however, it will be appreciated that the information storage device 116 may include various types of devices that are configured to store information. In one embodiment, the tag 116 may be attached to the meter socket 112 such that the tag 116 is non-removable. That is, the tag 116 cannot be removed without leaving clear physical evidence of its removal from the meter socket 112 and/or mechanically damaging the meter socket 112 or the tag 116, rendering either the meter socket 112 or the tag 116 inoperable. The tag 116 may be permanently attached to any part of the meter socket 112 with adhesive glue, double-sided or single-sided tape, soldering, or other similar adhesive commonly used by those skilled in the art.

The tag 116 may be a radio frequency identification (RFID) tag, such as a near field communication (NFC) tag. The tag 116 may contain electronically stored identification information that is unique to tag 116 and may be identified by using radio waves at, for example, a 13.56 MHz frequency. The tag 116 may contain an induction coil (not shown), that through excitation generated by a variable electromagnetic field generated by a reader, powers a small circuit (not shown) that is read by the reader through RF waves. In one embodiment, the tag 116 comprises an NFC tag, which is a subset of RFID tags. NFC tags may operate more efficiently in the presence of metals, such as the metal of a meter socket. In one embodiment, the tag 116 is a passive device. In other embodiments, the tag 116 may be an active device.

In an aspect, every meter socket 112 within a metering network may be equipped with a tag 116 that includes identification information that uniquely identifies that meter socket. Each tag 116 may be supplied in bulk, supplied with every meter 100, or pre-installed in the meter socket 112. For example, the tag 116 may be taped onto a cover of the meter 100 using a peel-off sticker. When a meter technician installs the meter 100 with the socket 112, the tag 116 may be peeled off and coupled to the socket 112. Each tag 116 may be pre-encoded or may be encoded by a technician installing the tag 116.

Figure 2:
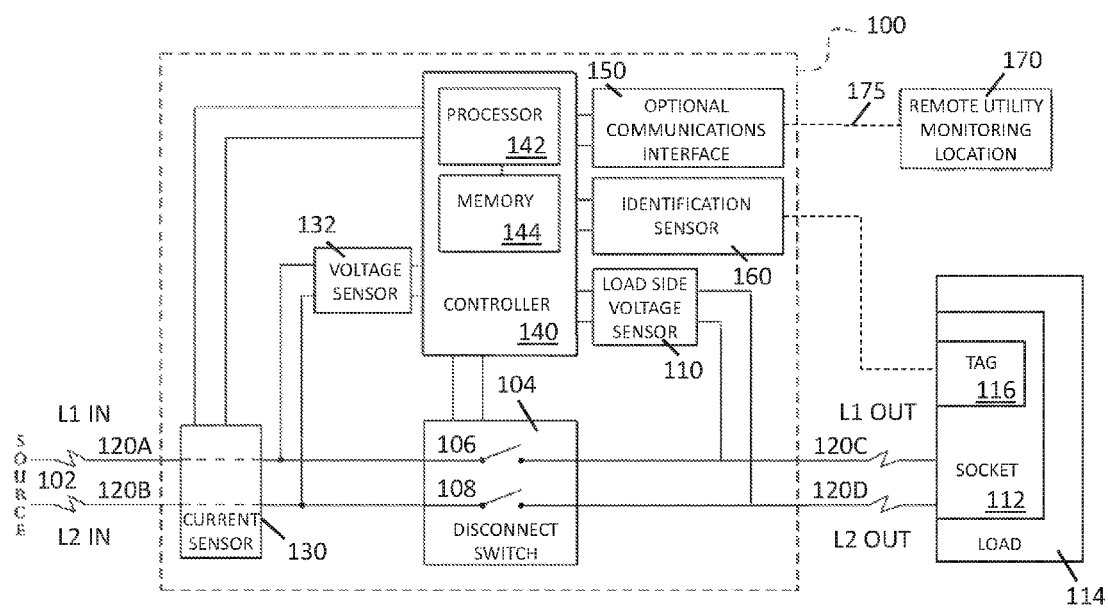
FIG. 2 illustrates a schematic of the metering system of FIG. 1, according to an aspect of the disclosure.

FIG. 2 illustrates an embodiment of a meter 100, according to an aspect of this disclosure. The meter 100 is interposed into electricity distribution lines 120, and the meter 100 is disposed between an electrical energy source 102 and an electrical load(s) 114 at a utility customer location. In the embodiment shown, the meter 100 meters electrical energy delivered from the source 102 to the load 114 via distribution lines 120. In particular, the meter 100 connects to a source-side of the distribution lines at contacts 120A and 120B and to a load-side at contacts 120C and 120D. The meter 100 measures the consumption of electrical energy by the load 114.

As further shown, the meter 100 comprises a disconnect switch 104, a load-side voltage sensor 110, a current sensor 130, a voltage sensor 132, a controller 140, an optional communications interface 150, and a sensor 160. The meter 100 may further comprise other components commonly used in metering devices, such as, for example, a load-side current sensor, a disconnect switch position sensor, or still other components. This description is specific to a single phase meter, but the principles are also applicable to poly-phase electricity meters as well.

The disconnect switch 104 is interposed into the distribution lines 120 and is configured to switch between an open position, in which electrical energy is not supplied to the electrical load 114, and a closed position, in which electrical energy is supplied to the electrical load 114. Electrical energy (at meter inputs "L1 IN" and "L2 IN") is supplied by the source 102 and delivered, via source side distribution lines 120A and 120B, through meter 100, to the electrical load at the customer location 114 (via meter outputs "L1 OUT" and "L2 OUT"). Disconnect switch or electrical relay 104 is interposed into the distribution lines, effectively separating the distribution lines into source side distribution lines 120A and 120B, and load-side distribution lines 120C and 120D. As shown, in this embodiment, the disconnect switch or relay 104 comprises two switches 106,108—one for each distribution line. When disconnect switch 104 is closed, electrical energy should be supplied to customer location 114, and when disconnect switch 104 is open, no electrical energy should be supplied to customer location 114. The switches 106, 108 may be driven by a motor, a solenoid, or other means commonly used to drive a disconnect switch.

The current sensor 130 and the voltage sensor 132 are configured to measure current flow and voltage, respectively, at contacts 120A and 120B on the source-side of the distribution lines 120. The load-side voltage sensor 110 is configured to measure voltage at contacts 120C and 120D on the load-side of the distribution lines 120. The current sensor 130, the voltage sensor 132, and the load-side voltage sensor 110 may provide signals to the controller 140 indicative of the current flow, source-side voltage, and load-side voltage, respectively.

The optional communications interface 150 may be configured to communicate with the controller 140 and a remote utility monitoring location 170. The optional communications interface 150 may be a two-way communications interface to the remote utility monitoring location 170 (e.g. head-end system) and may comprise any suitable communications interface technology, such as a radio frequency (RF) transceiver, or an interface to the telephone lines or power lines at the customer location 114, etc. The optional communication interface 150 may communicate with remote utility monitoring location 170 via communications link 175. Communications link 175 may be a private or public network, such as a subnet/LAN.

The controller 140 is configured to record data reflecting energy consumption measured by the meter 100 and to control various internal functions of the meter 100. The controller 140 may be an electronic control unit, computing device, central processing unit, or other data manipulation device that may be used to facilitate control and coordination of any of the methods or procedures described herein. While the controller 140 is represented as a single unit, in other aspects the controller 140 may be distributed as a plurality of distinct but interoperating units, incorporated into another component, or located at different locations on or off the meter 100.

In one embodiment, the controller 140 comprises a processor 142, such as a microprocessor, microcontroller, or the like, and a memory 144. The processor 142 may be operatively coupled to each of the sensors (110, 130, 132, 160), the disconnect switch 104, the memory 144, and the optional communications interface 150. The processor 142 may be configured to receive signals from each of the sensors (110, 130, 132, 160), the disconnect switch 104, the memory 144, and the optional communications interface 150, to process the signals, and to store the signals in memory 144.

The memory 144 may include random access memory (RAM), read-only memory (ROM), non-volatile memory, such as electrically erasable programmable ROM (EEPROM) or flash memory, or combinations thereof. The memory 144 may store pairing information that associates electrical energy consumption measured by the meter with the identification information of the tag 116. The memory 144 may also store computer executable code including at least one algorithm for associating energy consumption data recorded by the meter 100 with the identification information of the tag 116. The identification information may be stored in a table format or in the form of billing registers, as described herein.

The sensor 160, also referred to as a reader, may be coupled to the controller 140. The sensor 160 is configured to obtain (e.g., read) the identification information from the tag 116 and provide a signal indicative of the identification information to the controller 140. The sensor 160 may be an RFID reader and/or a NFC reader.

The utility monitoring station 170 may send and receive commands to and from the meter 100 via communications link 175. In response to a command, the controller 140 may operate the meter 100 by, for example, operating the disconnect switch 104 to open or close position, reading measured current or voltage information within the distribution lines 120, reading the identification information obtained from the tag 116, or performing other metering operations. Information received by the controller 140 from the utility monitoring station 170, sensors, or other metering components may be stored in memory 144. Information received by the controller 140 may also be provided to the remote utility monitoring location 170 to be stored remotely.

Figure 3:
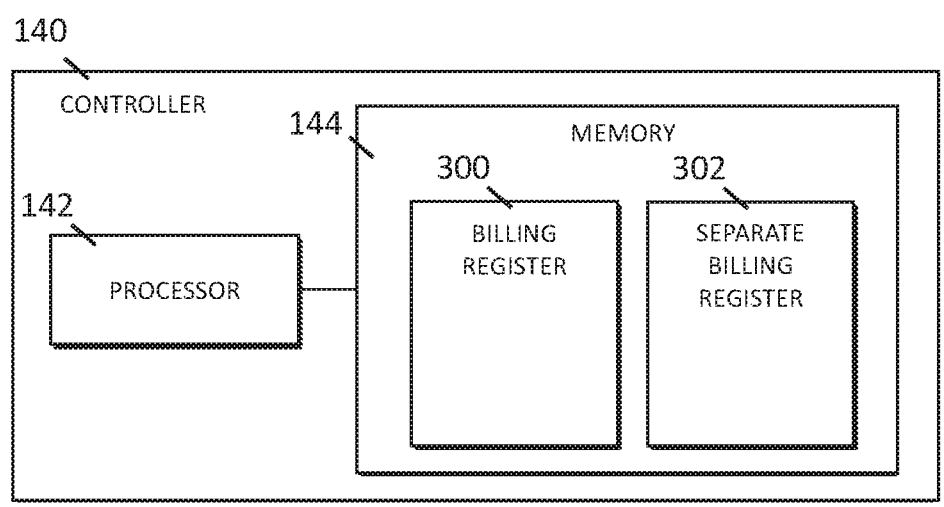
FIG. 3 illustrates a schematic of a controller, according to an aspect of the disclosure.

FIG. 3 illustrates a schematic of the controller 140, according to one embodiment. As shown, in the illustrated embodiment, the controller 140 comprises the processor 142 and the memory 144. As further shown, the memory 144 stores data reflecting measured energy consumption in a first billing register 300. In addition, as described hereinafter, the memory 144 may also store one or more additional, separate billing register(s) 302.

The "billing register" or as called in the ANSI C12.19 standard "Table 23 Current Register Data Table" (ST23) is a table that stores current billing cycle billing information (energy consumption, demand, etc.). The ANSI C12.19 standard also describes "Table 26 Self-read Data Table" (ST26). This table contains snapshots of the current billing data table (ST23) taken when a new socket is detected. A manufacturer table (socket IDs snapshots table) may be used to store the different socket identification information for each billing data snapshot. There is a one to one correspondence between the socket IDs snapshots table entries and the billing data snapshots stored in ST26.

In accordance with an aspect of the system and method described herein, during installation of meter 100 into the meter socket at a given customer location, the meter 100 may be paired with identification information of the tag 116 of the meter socket 112. In one embodiment, a technician may use an installation tool (not shown) equipped with a tag reader to read the tag 116 of the meter socket 112 and then to input the identification information to the meter 100. In other embodiments, the sensor 160 of the meter 100 may automatically read the identification information from the tag 116 upon insertion of the meter 100 into the socket 112 during initial installation. The meter 100 may then store information indicative of its pairing with the identification information for the socket 112. In this respect, the stored identification information obtained from the tag 116 of the meter becomes the "expected" identification information for that meter. This pairing of the meter 100 with the identification information of the tag 116 may also be recorded by the technician using the installation tool, or the pairing may be reported by the meter 100 to the remote utility monitoring location 170 via the communication interface 150.

Thereafter, in operation, upon power up of the meter 100, the sensor 160 may read the tag 116 attached to the meter socket 112 to obtain its identification information and may compare the identification information read from the tag to the "expected" identification information recorded during the initial meter pairing. If a mismatch is detected, the meter may determine that a potential tamper situation or theft of service has occurred, e.g., that the meter is not installed in the expected meter socket.

Figure 4:
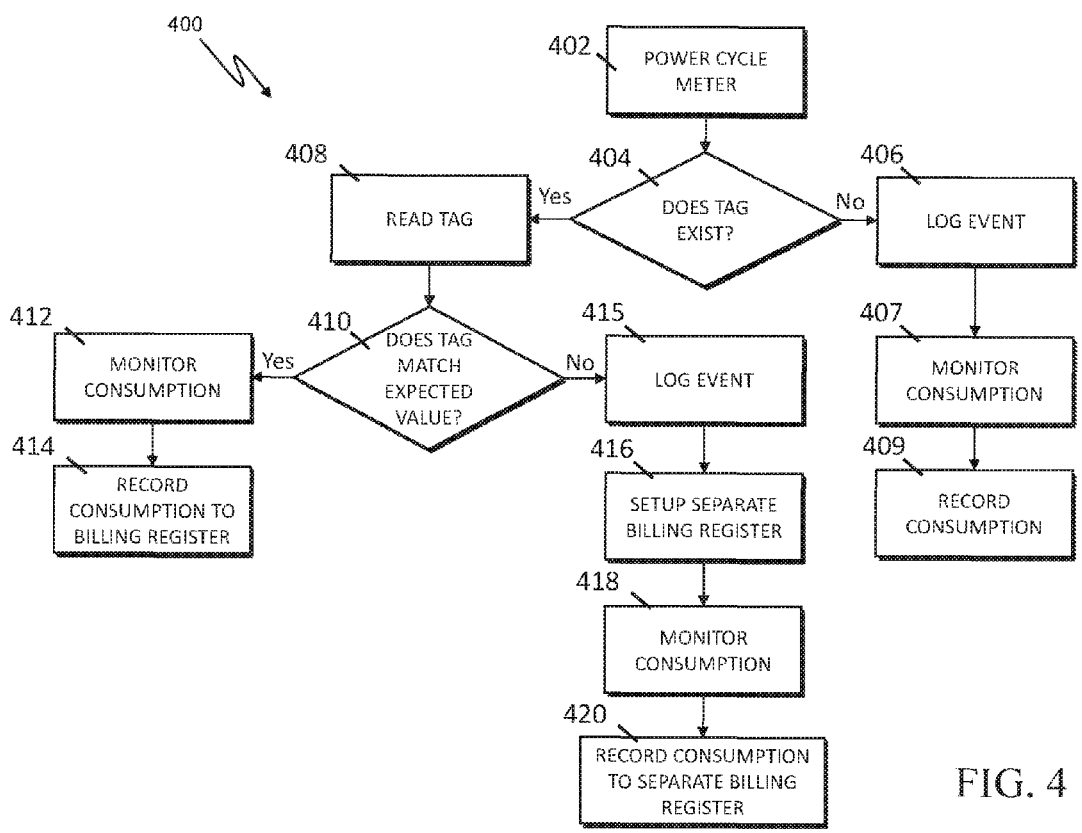
FIG. 4 is a flowchart illustrating one embodiment of a method for monitoring consumption of electricity within a metering system, according to an aspect of the disclosure.

FIG. 4 illustrates a method 400 for metering electrical energy consumption by the meter 100, according to an aspect of this disclosure. At step 402, the meter 100 is power cycled (e.g., powered up after a power down). At step 404, the sensor 160 of the meter 100 attempts to read the tag 116. If no tag 116 is detected, then at step 406, the meter 100 reports and logs the event. The event may be stored in memory 144 and/or transmitted to the remote utility monitoring location 170. In this case, the meter 100 may generate an error, and at step 407, the meter 100 may begin to monitor energy consumption at the customer location 114. At step 409, the processor 142 stores the energy consumption data in memory 144 and tags the data with a "no tag" identification in the data log.

If the tag 116 is detected, then the meter 100 continues to step 408. At step 408, the sensor 160 reads the identification information from the tag 116 and provides a signal to the processor 142 indicative of the identification information. The processor 142 may store the identification information from the tag 116 in memory 144 and/or may transmit the identification information via the optional communications interface 150 to the remote utility monitoring location 170. At step 410, the processor 142 compares the signal indicative of the identification information read from the tag 116 with the expected tag 116 identification information stored during the initial pairing of the meter 100 with the socket 112. If the signal indicative of the identification information read from the tag 116 matches the expected identification information recorded during the pairing process, then, at step 412, the meter 100 begins to monitor energy consumption at the customer location 114. At step 414, the processor 142 stores the energy consumption data in the billing register 300 of the memory 144, which is associated with the identification information of the tag 116 of the meter socket 112.

If, however, the signal indicative of the identification information read from the tag 116 of meter socket 112 in step 408 does not match the expected identification information recorded during the pairing process, then the processor 142 may determine that the meter has been installed into an unexpected meter socket. The processor 142 may send an alert to the remote utility monitoring location 170 of this detected event, and log the event (415). In addition, at step 416, the processor 142 may create a separate billing register, e.g., billing register 302, in the memory 144 and may associate the separate billing register 302 with the unexpected identification information read from the tag 116 of the newly detected meter socket 112. At step 418, the meter proceeds to measure energy consumption in the newly detected meter socket 112, and at step 420, energy consumption data is stored by the processor 142 in the separate billing register 302. In this manner, no prior energy consumption will be lost in the event that an unscrupulous customer disconnects the meter 100 from its expected meter socket and installs it in a meter socket of another utility customer.

Alternatively, at step 416, the processor 142 may search the memory 144 of the meter 100 for a previously created billing register associated with the identification information read from the tag 116 of the meter socket 112 in which the meter has been installed. If a billing register associated with the identification information read from the tag 116 already exists, then the energy consumption data generated by the meter 100 may be stored in that existing billing register. This may be helpful for situations in which the meter 100 is expected to be removed and reinstalled from time-to-time in two or more different meter sockets.

As discussed above, in the event of a detected mismatch, the meter 100 may determine that a tamper event has occurred. A tamper event may be an illicit attempt to modify the meter's ability to measure or record energy usage in an attempt to reduce the customer's energy bill. Also, moving the meter, in an attempt to associate the meter's energy accumulation with another customer, is also a form of tampering. The meter 100 may report the suspected tamper event to the remote utility monitoring location 170 via, for example, its communication interface 150. In addition, the meter 100 may automatically, or in response to a command from the utility monitoring location 170, open its disconnect switch 104 to disconnect service to the customer location— to prevent potential further theft of service. The disconnect switch may remain in the open position until a technician can be dispatched to investigate the situation or until such time as the utility monitoring location 170 determines that service may be restored.

While the disclosure is described herein using a limited number of embodiments, these specific embodiments are for illustrative purposes and are not intended to limit the scope of the disclosure as otherwise described and claimed herein. Modification and variations from the described embodiments exist. The scope of the invention is defined by the appended claims.

What is claimed is:

1. A metering system comprising:
a meter socket;
an information storage device coupled to the meter socket, the information storage device comprising identification information stored thereon that represents a geographical location of the meter socket;
a meter configured to couple to the meter socket, the meter comprising:
a sensor configured to read the identification information from the information storage device coupled to the meter socket and to provide a signal indicative of the identification information; and
a controller configured to record data indicative of energy consumption measured by the meter, the controller including:
a memory, and
a processor configured to receive the signal indicative of the identification information and associate the energy consumption data with the identification information, the processor further configured to store the energy consumption data associated with the identification information in the memory, wherein if the identification information from the information storage device is not detected the meter is further configured to transmit an indication that the identification information from the information storage device is not detected to a utility, and the controller is further configured to store the energy consumption data in the memory.

2. The system of claim 1, wherein the information storage device comprises a tag.

3. The system of claim 2, wherein the tag comprises a radio frequency identification (RFID) tag.

4. The system of claim 3, wherein the RFID tag comprises a near field communication (NFC) tag.

5. The system of claim 1, wherein the memory is further configured to store expected identification information for the meter socket with which the meter has been previously paired.

6. The system of claim 1, wherein the sensor is further configured to read the identification information of the information storage device of the meter socket in which it has been installed each time the meter is power cycled.

7. The system of claim 1, wherein the information storage device is not removable from the meter socket, such that removal of the information storage device would render the meter socket inoperable.

8. The system of claim 1, wherein the controller is located within the meter.

9. The system of claim 1, wherein the meter is further configured for metering electrical energy delivered from a voltage source to an electrical load at a customer location, the meter further comprises a disconnect switch for switching between an open position in which electrical energy is not supplied to said electrical load and a closed position in which electrical energy is supplied to said electrical load, and wherein the processor is further configured to control the disconnect switch to the open position if the processor does not receive the signal indicative of the identification information or if the signal indicative of the identification information does not match expected identification information for the meter.

10. The system of claim 1, wherein the meter further comprises blades, wherein the meter socket is configured to receive and electrically connect with the blades.

11. In a metering system having a meter socket and a meter, a method for associating the meter with the meter socket comprising: reading identification information from an information storage device coupled to the meter socket, the identification information representing a geographical location of the meter socket; if the identification information from the information storage device is not detected, transmitting an indication to a utility that the identification information from the information storage device is not detected; recording data indicative of energy consumption measured by the meter; if the identification information from the information storage device is detected, associating the energy consumption data with the identification information read from the information storage device coupled to the meter socket; and storing the energy consumption data associated with the identification information in a memory of the meter.

12. The method of claim 11, wherein reading the identification information from the information storage device is performed each time the meter is powered up.

13. The method of claim 11, further comprising:
creating a billing register in the memory;
associating the billing register with the identification information read from the information storage device; and
storing the energy consumption data in the associated billing register.

14. A metering device configured to couple to a meter socket, the meter socket including an information storage device comprising identification information that represents a geographical location of the meter socket, the metering device comprising: a meter including a sensor configured to read the identification information from the information storage device of the meter socket; and a controller configured to record data indicative of energy consumption data measured by the meter, the controller including a memory and a processor, the memory configured to store the energy consumption data, and the processor configured to associate the energy consumption data with the identification information from the meter socket, the processor further configured to store the energy consumption data associated with the identification information in the memory, wherein if the identification information from the information storage device is not detected the meter is further configured to transmit an indication that the identification information from the information storage device is not detected to a utility, and the controller is further configured to store the energy consumption data in the memory.

15. The metering device of claim 14, wherein the meter further comprises blades, wherein the meter socket is configured to receive and electrically connect with the blades.

16. The metering device of claim 14, wherein the controller is located within the meter.

17. The metering device of claim 14, further comprising:
a transceiver configured to transmit the identification information from the meter to a head end system.

* * * * *